United States Patent [19]
Webb

[11] 3,794,372
[45] Feb. 26, 1974

[54] MEANS FOR DECREASING TRAILER DRAG

[76] Inventor: William Webb, R.R. 7, Guelph, Ontario, Canada

[22] Filed: Sept. 28, 1972

[21] Appl. No.: 295,359

[52] U.S. Cl. ............................................. 296/1 S
[51] Int. Cl. .......................................... B62d 35/00
[58] Field of Search.................... 296/1 S, 91, 95 R

[56] References Cited
UNITED STATES PATENTS

| | | | |
|---|---|---|---|
| 3,348,873 | 10/1967 | Saunders | 296/1 S |
| 3,596,974 | 8/1971 | Adams | 296/1 S |
| 2,853,129 | 9/1958 | Leavitt et al. | 296/95 R X |
| 2,989,339 | 6/1961 | Southall | 296/95 R |
| 2,644,716 | 7/1953 | McVicker | 296/91 |
| 3,309,131 | 3/1967 | Saunders | 296/1 S |
| 3,695,673 | 10/1972 | Meadows | 296/1 S |

*Primary Examiner*—David Schonberg
*Assistant Examiner*—John A. Pekar

[57] ABSTRACT

An air deflector is mounted on the roof of a towing vehicle to deflect air upwardly and sideways relative to a trailer, thereby decreasing the drag of the trailer. The air deflector inclines rearwardly and upwardly from a front edge which rests sealingly on the roof of the towing vehicle as close as possible to the top of the windshield, the deflector widening rearwardly and having depending side surfaces, with means extending between the roof and the deflector for varying the inclination of the deflector.

9 Claims, 7 Drawing Figures

PATENTED FEB 26 1974 3,794,372

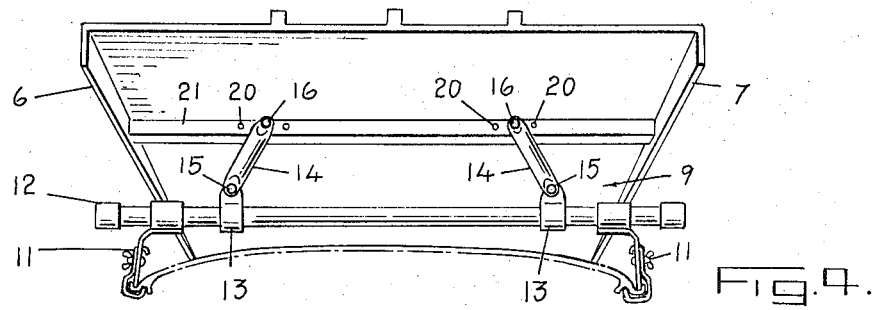
Fig. 4.
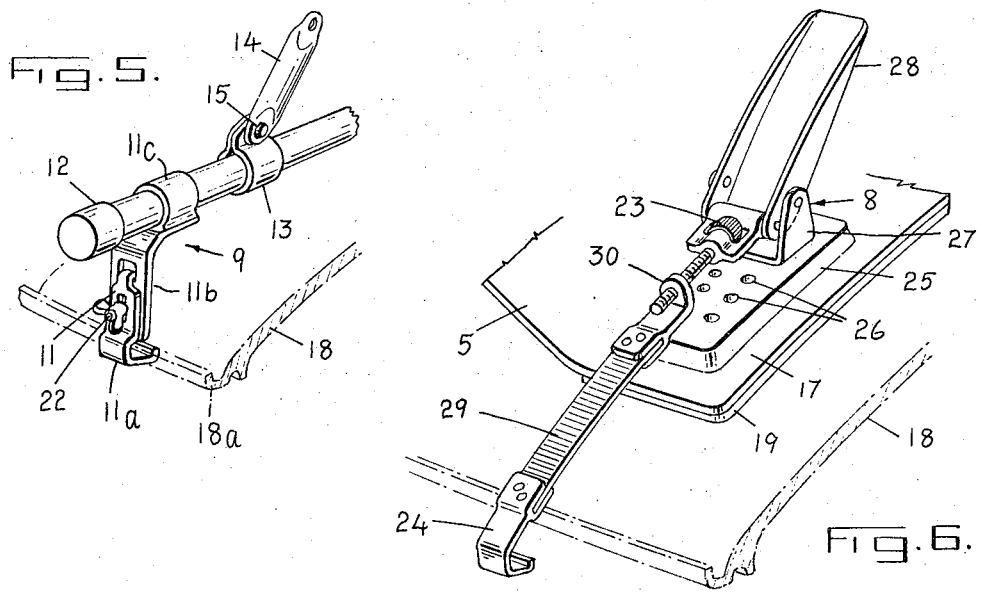
Fig. 5.
Fig. 6.
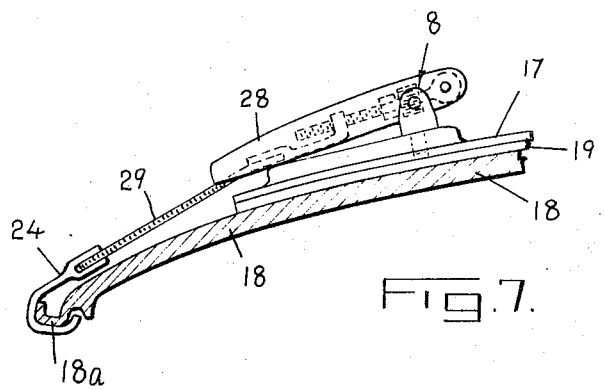
Fig. 7.

MEANS FOR DECREASING TRAILER DRAG

BACKGROUND OF THE INVENTION

1. Field of the Invention

This invention relates to an air deflector that is mounted on the roof of a towing vehicle to reduce the drag caused by a trailer.

2. Description of the Prior Art

It is known to mount an air deflector on the roof of a towing vehicle to lessen the drag of a trailer, but previous deflectors have suffered from various disadvantages, e.g., they have not been adjustable, or have been complex or inefficient or have not been locatable in a satisfactory relationship to the roof of the towing vehicle.

SUMMARY OF THE INVENTION

This invention relates to a means of deflecting air flowing over the roof of the towing vehicle so that the air tends to flow above and to either side of the trailer being towed, thereby reducing the drag of the trailer and increasing the gas mileage of the towing vehicle. This deflection of air is achieved by a deflector having a front edge, a back edge and two side edges. The deflector is mounted on the roof of the towing vehicle, its front edge extending across and conforming to the roof, preferably close to the top of the windshield of the towing vehicle, the back edge extending into the air towards the trailer, the inclination of the deflector being adjustable for different trailer heights. A sealing strip is provided along the front edge of the deflector to prevent air flow between the front edge and the roof. A side surface extends downward from each of the side edges, the side surfaces increasing in height from front to back.

BRIEF DESCRIPTION OF THE DRAWINGS

FIG. 4 is a rear view of the air deflector mounted on the roof of a towing vehicle, the roof of the vehicle being again shown in phantom;

FIG. 5 is a perspective view of part of the supporting and adjusting apparatus, showing the roof of the vehicle in phantom;

FIG. 6 is a perspective view of a clamp for securing the front end of the deflector to the car roof (shown in phantom), the clamp being in an open position; and FIG. 7 is a side view of the front clamp in a closed position, hooked on to the vehicle roof.

DESCRIPTION OF THE PREFERRED EMBODIMENT

Figure 1:
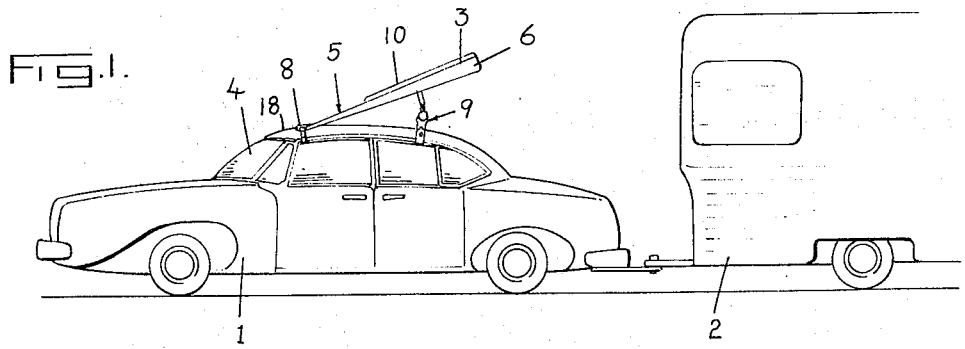
FIG. 1 is a side view of an air deflector mounted on the roof of a vehicle towing a trailer.
Figure 2:
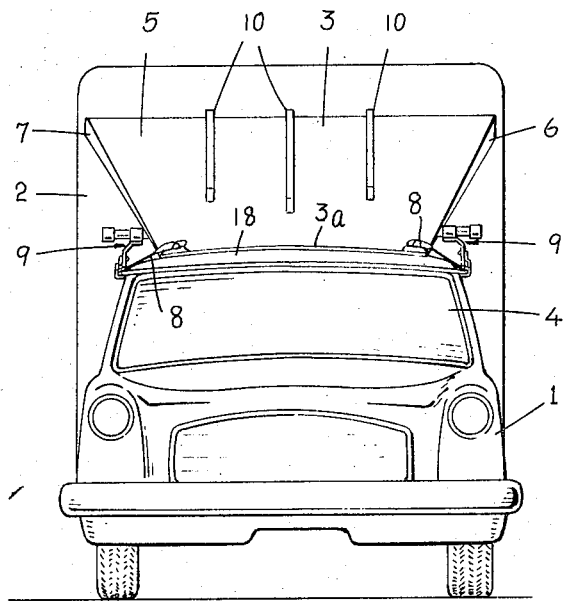
FIG. 2 is a front view of the air deflector, the vehicle and the trailer of FIG. 1.

Referring to FIGS. 1 and 2, an automobile 1 is shown towing a trailer 2. An air deflector 3 is mounted on the roof 18 of the automobile 1 with the front edge 3a of the deflector as close as possible to the top of the windshield 4, the deflector being inclined rearwardly and upwardly from its front edge. The deflector is at a smaller angle to the horizontal than the windshield, to reduce drag caused by the deflector, but the deflector, being adjacent the forwardly and downwardly sloping windshield, approximates a rearward extension of the windshield so that air flowing up the windshield tends to continue flowing upwardly rather than travelling horizontally along the roof 18. Air flowing up from the windshield 4 forces the air immediately above it upward to miss the deflector entirely. In other words, the deflector forms as near as possible a rearward continuation of the windshield in order to minimize drag caused by the deflector.

The air deflector 3 has a flat top surface 5 and side surfaces 6, 7. The surface 5 widens from front to rear and forces air to flow over the top front edge of the trailer 2. The side surfaces 6, 7 deflect air away from the front of the trailer 2 to flow along the sides thereof. The deflector is rigid and can be of metal but preferably is of light weight fibreglass or molded plastic material with longitudinal stiffening ribs 10.

Front clamps 8 hold the front edge 3a of the air deflector 3 against the roof of the automobile, as described in greater detail below. The rear portion of the deflector is adjustably supported by apparatus 9 (also described below) extending between the roof and the deflector. The inclination of the deflector relative to the roof 18 is adjustable by means of the apparatus 9, and is so adjusted that an imaginary straight line from the front edge through the back edge of the top surface 5 passes slightly above the top front edge of the trailer 2.

Figure 3:
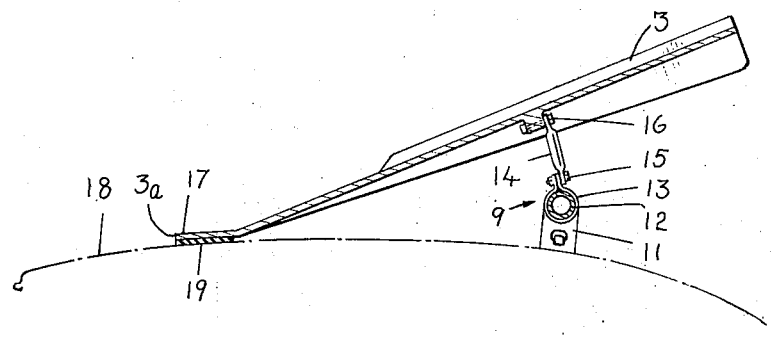
FIG. 3 is a longitudinal sectional view of the deflector showing details of apparatus for supporting the deflector, and adjusting its inclination, the roof of the towing vehicle being indicated by a phantom line.

Referring to FIGS. 3 to 5, parts of the apparatus 9 are shown in greater detail. As best seen in FIG. 5, a clamp 11 is attached to the gutter 18a at each side of the roof of the automobile 1. Each clamp 11 consists of a lower part 11a that hooks under the gutter 18a and an upper part 11b that slides downwardly into the gutter, the parts then being tightened together by means of a nut 22. The upper clamp part 11b has a cylindrical socket 11c in which is frictionally received a horizontal bar 12 that extends transversely over the car roof. A pair of clasps 13 on the bar 12 support arms 14 which in turn support the deflector 3, the clasps being connected to the arms 14 by bolts 15 and the arms 14 being connected by bolts 16 to a transverse rib 21 of the deflector. When bolts 15, 16 are loosened, the clasps 13 can be slid along the bar 12 and, as the angle of the arms 14 relative to the bar 12 changes, the height and inclination of the deflector 3 changes, the deflector rocking about its front edge which is fastened, as described below, to the roof 18. Holes 20 in the rib 21 allow the height of the rear portion of the deflector 3 to be adjusted by removing the bolts 16 and inserting them in the appropriate holes 20. The side surfaces 6, 7 increase in height from front to rear, their height being limited by the lowest inclination to which the deflector may be adjusted.

The front edge 3a of the deflector is curved, as seen in FIG. 2, to conform to the slightly upward curvature of the roof 18, and the edge 3a extends across substantially the full width of the roof. The deflector has a front lip 17 from which the surface 5 is inclined rearwardly and upwardly, and at the underside of the lip along the edge 3a is a deformable sealing strip 19 for sealingly engaging and conforming to the roof 18. The strip 19 protects the roof from being scratched by the deflector, and prevents air from passing between the front edge 3a and the roof. To secure the front edge 3a against the roof, a clamp 8 is affixed to each end of the lip 17, a clamp 8 being shown in an open position in FIG. 6 and in a closed position in FIG. 7. Each clamp has a base 25 fixed to the lip 17 and a bracket 27 secured to the base. Pivoted on the bracket 27 is an arm 28 connected to a hook 24 by means of a flexible strap 29, a nut 30 and an adjusting screw 23. When the arm 28 is swung from the position shown in FIG. 6 to that shown in FIG. 7 the hook 24 grips the roof gutter 18a. Screw 23 can accommodate minor adjustments that may be required in the distance between the hook 24 and the base 25. Major adjustments can be made by fastening the bracket 27 at different pairs of holes 26 in the base 25.

What I claim as my invention is:

1. For use on the roof of a towing vehicle which is towing a trailer, a rigid air deflector having a front edge that extends substantially across the width of the front portion of the roof of the towing vehicle and is shaped to rest on and conform to the front portion of the roof of the towing vehicle in contact therewith along substantially the entire length of the front edge with the deflector inclined rearwardly and upwardly therefrom, means for securing the front edge on the front portion of the roof to prevent flow of air between the front edge and the roof, the front edge being rockable on the roof while maintaining said contact with the roof along substantially the entire length of the front edge, and means rearward of the front edge for supporting the deflector and adjusting the inclination of the deflector relative to the roof by rocking the front edge on the roof in said contact therewith whereby the deflector can be adjusted to direct air over the top of the trailer while maintaining a seal against flow of air between the front edge and the roof.

2. A device as claimed in claim 1 wherein the deflector increases in width from front to rear.

3. A device as claimed in claim 2 wherein the deflector has side edges from each of which a side surface extends downwardly, the side surfaces increasing in height from the front to the rear to direct air flow away from the sides of the towing vehicle and trailer.

4. A device as claimed in claim 1 wherein the rigid front edge is defined by a front lip from which the top surface of the deflector is inclined rearwardly and upwardly, and at the underside of the lip a deformable sealing strip for sealingly engaging and conforming to the roof of the towing vehicle.

5. A device as claimed in claim 4 wherein the means for securing the front edge on the roof comprise a clamp affixed to each end of the lip, each clamp having a hook engageable with a roof gutter of the towing vehicle.

6. A device as claimed in claim 1 wherein the deflector has longitudinal reinforcing ribs extending upwardly therefrom.

7. For use on the roof of a towing vehicle which is towing a trailer, an air deflector having a front edge shaped to rest on and conform to the front portion of the roof of the towing vehicle with the deflector inclined rearwardly and upwardly therefrom, means for securing the front edge on the front portion of the roof to prevent flow of air between the front edge and the roof, the front edge extending substantially across the width of the roof, and the deflector increasing in width from front to rear, and means rearward of the front edge for adjusting the inclination of the deflector relative to the roof whereby the deflector can be adjusted to direct air over the top of the trailer, the means for adjusting the inclination of the deflector comprising a pair of clamps securable one on either side of the towing vehicle, a transverse bar extending between said clamps, a pair of arms extending upwardly from the bar to the deflector, and means for adjusting the angles of the arms relative to the bar.

8. In combination with a vehicle for towing a trailer, the vehicle having a slightly upwardly curved roof with a windshield sloping downwardly and forwardly from the front of the roof, a rigid air deflector having a front edge extending substantially across the roof adjacent the windshield, the front edge being secured to and conforming to the roof adjacent the windshield and preventing air flow between the front edge and the roof across substantially the entire width of the roof, the deflector being inclined rearwardly and upwardly from the roof so as to approximate a rearward extension of the windshield but at a smaller angle to the horizontal than the windshield, the deflector increasing in width from front to rear, the front edge of the deflector being rockable on the roof to vary its inclination while conforming to the roof along its front edge across substantially the entire width of the roof to prevent said air flow between the front edge and the roof, and means extending between the roof and the deflector for adjusting the inclination of the deflector.

9. The combination claimed in claim 8 wherein the inclination of the deflector is adjusted so that an imaginary line from the front edge to the rear of the deflector passes slightly above a towed vehicle.

* * * * *